United States Patent
Soni et al.

(10) Patent No.: US 10,599,299 B2
(45) Date of Patent: Mar. 24, 2020

(54) RECOMMENDING A TRANSITION FROM USE OF A LIMITED-FUNCTIONALITY APPLICATION TO A FULL-FUNCTIONALITY APPLICATION IN A DIGITAL MEDIUM ENVIRONMENT

(71) Applicant: Adobe Inc., San Jose, CA (US)

(72) Inventors: Sachin Soni, New Delhi (IN); Ashish Duggal, Delhi (IN); Anmol Dhawan, Ghaziabad (IN)

(73) Assignee: Adobe Inc., San Jose, CA (US)

( * ) Notice: Subject to any disclaimer, the term of this patent is extended or adjusted under 35 U.S.C. 154(b) by 430 days.

(21) Appl. No.: 15/081,302

(22) Filed: Mar. 25, 2016

(65) Prior Publication Data
US 2017/0277549 A1    Sep. 28, 2017

(51) Int. Cl.
*G06F 3/0484* (2013.01)
*G06F 17/21* (2006.01)
(Continued)

(52) U.S. Cl.
CPC .......... *G06F 3/0484* (2013.01); *G06F 3/0482* (2013.01); *G06F 3/04842* (2013.01);
(Continued)

(58) Field of Classification Search
CPC ........ G06F 9/453; G06F 17/24; G06F 17/211; G06F 17/212; G06F 3/0482;
(Continued)

(56) References Cited

U.S. PATENT DOCUMENTS 6,351,317 B1 *  2/2002  Sasaki ................. G06K 15/007
                                            358/1.12
8,732,617 B1 *  5/2014  Armstrong .......... G06F 3/04817
                                            715/835
(Continued)

OTHER PUBLICATIONS

"Combined Search and Examination Report", GB Application No. 1700805.3, dated Jun. 30, 2017, 9 pages.
(Continued)

*Primary Examiner* — Kieu D Vu
*Assistant Examiner* — Roberto Borja
(74) *Attorney, Agent, or Firm* — SBMC

(57) ABSTRACT

A digital medium environment is described to recommend a transition from use of a limited-functionality application to a full-functionality application. As described herein, the limited-functionality application includes a subset of the functionalities of the full-functionality application. Interactions by a user with a limited-functionality application to generate or edit a creation (e.g., a photo, video, or document) are monitored. Based on the interactions, it is determined that the user needs a functionality for the creation that is not available in the limited-functionality application but is supported by the full-functionality application. A recommendation to transition the creation to the full-functionality application that supports the functionality is displayed. The recommendation may include a selectable control that, when selected, causes the creation to be transitioned to the full-functionality application to enable the functionality to be applied to the creation.

19 Claims, 9 Drawing Sheets

(51) Int. Cl.
*G06F 17/24* (2006.01)
*G06Q 30/06* (2012.01)
*G06F 9/48* (2006.01)
*G06F 3/0488* (2013.01)
*G06F 3/0482* (2013.01)
*G06F 9/451* (2018.01)
*H04L 29/08* (2006.01)

(52) U.S. Cl.
CPC ........ *G06F 3/04883* (2013.01); *G06F 9/4856* (2013.01); *G06F 17/211* (2013.01); *G06F 17/212* (2013.01); *G06F 17/24* (2013.01); *G06Q 30/0631* (2013.01); *G06F 9/453* (2018.02); *G06F 2203/04803* (2013.01); *H04L 67/02* (2013.01)

(58) Field of Classification Search
CPC ............. G06F 3/0484; G06F 17/30867; G06F 3/04842; H04L 67/02
See application file for complete search history.

(56) References Cited

U.S. PATENT DOCUMENTS

| | | | | |
|---|---|---|---|---|
| 2006/0277469 | A1* | 12/2006 | Chaudhri | G06F 3/04817 715/709 |
| 2007/0276728 | A1* | 11/2007 | Bala | G06F 21/121 705/14.54 |
| 2012/0046075 | A1* | 2/2012 | Griffin | G06F 1/1624 455/566 |
| 2012/0124126 | A1* | 5/2012 | Alcazar | H04L 67/16 709/203 |
| 2013/0120279 | A1* | 5/2013 | Plichta | G06F 3/04883 345/173 |
| 2013/0173637 | A1* | 7/2013 | Kim | G06F 17/30283 707/748 |
| 2013/0179256 | A1* | 7/2013 | Farrell | G06Q 30/02 705/14.49 |
| 2014/0165000 | A1* | 6/2014 | Fleizach | H04M 19/04 715/810 |
| 2015/0046884 | A1* | 2/2015 | Moore | G06F 3/0481 715/863 |
| 2015/0254358 | A1 | 9/2015 | VanBlon et al. | |
| 2016/0077674 | A1* | 3/2016 | Forster | G06F 3/0481 715/753 |

OTHER PUBLICATIONS

"Foreign Office Action", GB Application No. 1700805.3, dated Sep. 26, 2018, 7 pages.

"Foreign Office Action", GB Application No. 1700805.3, Nov. 8, 2019, 9 pages.

* cited by examiner

RECOMMENDING A TRANSITION FROM USE OF A LIMITED-FUNCTIONALITY APPLICATION TO A FULL-FUNCTIONALITY APPLICATION IN A DIGITAL MEDIUM ENVIRONMENT

BACKGROUND

An application developer may develop different versions of an application in a digital medium environment. For example, a "full-functionality" version of the application may include all of the functionality or features of the application, whereas a "limited-functionality" version of the application may include just a subset of the functionality and features provided by the full-functionality application.

The different versions of the application may be developed based on capabilities or hardware features of different types of devices. For example, a "desktop" version of the application may include full-functionality and be configured for playback on a personal computer, such as a desktop computing device or a laptop. In addition, a "mobile" version of the application may include limited-functionality and be configured for playback on a mobile device, such as a smartphone or a tablet computing device. In this case, the full-functionality application is designed to be executed on devices with a larger screens and greater processing capabilities than the limited-functionality application.

The different versions of the application may also be developed such that the user is required to pay for the full-functionality version of the application, but does not need to pay (or pays a reduced amount) for the limited-functionality application. For example, a mobile version of the application may be free and configured to be run on a mobile device, whereas the desktop version of the application may cost money and be configured to be run on a more powerful device.

A user of a limited-functionality application may wish to perform a particular functionality or operation that is not available in the limited-functionality version of the application, but is supported by the full-functionality version of the application. In this instance, the user may become frustrated by being unable to utilize the functionality, without knowing that the desired functionality could be implemented in the full-functionality version of the application.

SUMMARY

A digital medium environment is described to recommend a transition from use of a limited-functionality application to a full-functionality application. As described herein, the limited-functionality application includes a subset of the functionalities of the full-functionality application. Interactions by a user with a limited-functionality application to generate or edit a creation (e.g., a photo, video, or document) are monitored. Based on the interactions, it is determined that the user needs a functionality for the creation that is not available in the limited-functionality application but is supported by the full-functionality application. A recommendation to transition the creation to the full-functionality application that supports the functionality is displayed. The recommendation may include a selectable control that, when selected, causes the creation to be transitioned to the full-functionality application to enable the functionality to be applied to the creation.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
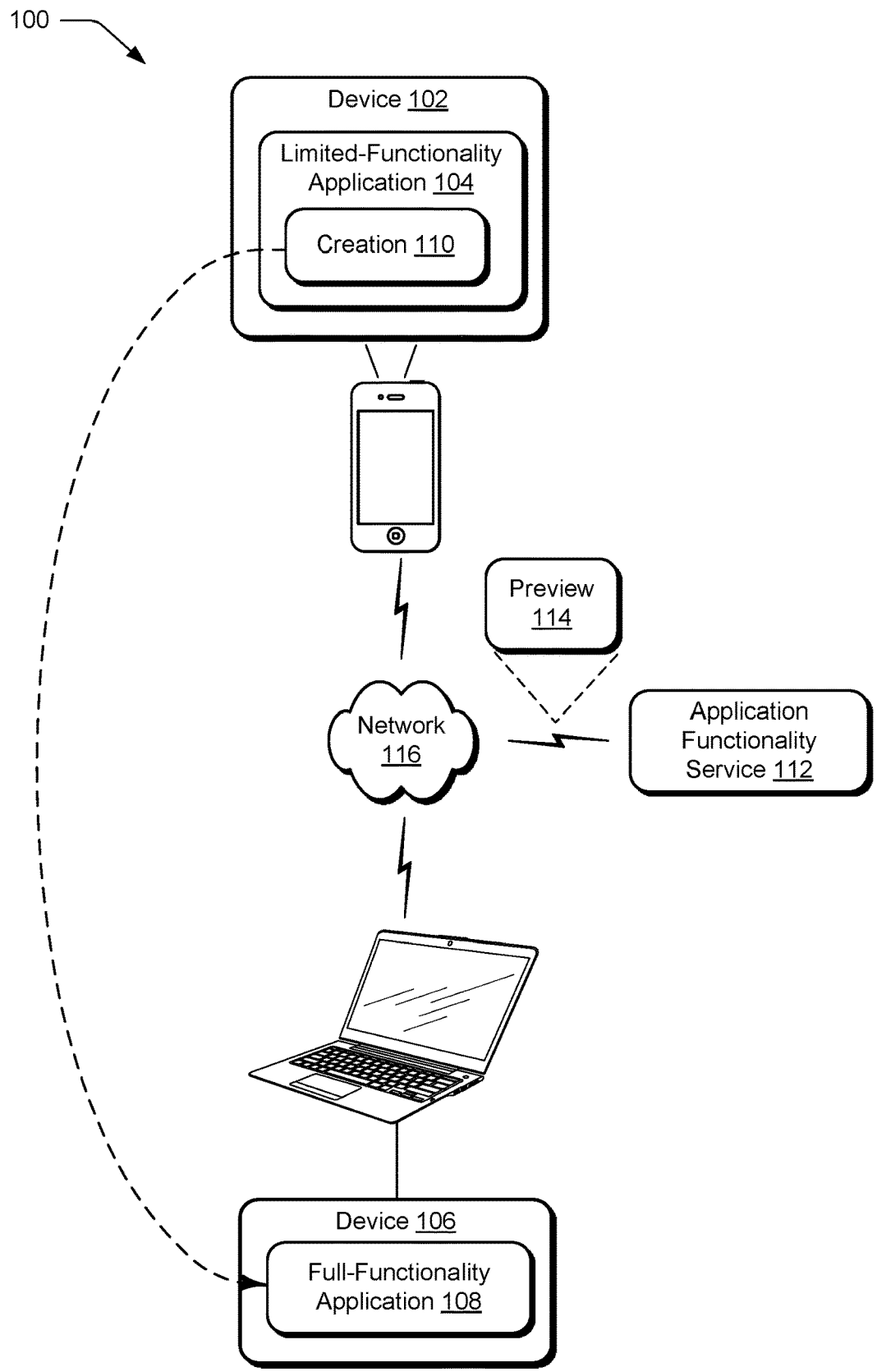
FIG. 1 is an illustration of a digital medium environment in an example implementation that is operable to employ techniques described herein.

A digital medium environment is described to recommend a transition from use of a limited-functionality application to a full-functionality application in a digital medium environment. In various embodiments, interactions by a user with a limited-functionality application to generate or edit a creation are monitored. As described herein, a creation corresponds to any type of product that can be created using an application, such as photos, videos, documents, songs, and web pages, to name just a few. A limited-functionality application corresponds to a version of an application that includes a subset of the functionality of a full-functionality version of the application. Examples of full-functionality applications include InDesign®, Photoshop®, and Illustrator® by Adobe®, while examples of limited-functionality applications include Adobe® Comp, Photoshop® Touch, Photoshop® Sketch, Photoshop® Mix, and so forth.

Generally, full-functionality applications (e.g., desktop applications) are designed for professional work and thus they offer increased functionality and power to users. However, limited-functionality applications (e.g., mobile apps) are portable, making it easier for users to create or edit creations in a variety of different settings.

While the user is utilizing the limited-functionality application to generate or edit the creation, it is dynamically determined, based on the interactions with the application, that the user needs a functionality for the creation that is not available in the limited-functionality version of the application. Consider, for example, a text-editing application that, in the limited-functionality version, allows a user to write text into a single column, but does not allow the user to create two or more columns. However, the full-functionality version of the application may allow the user to generate text in two or more columns. Thus, in this example, it can be determined that the user needs the functionality to create two columns, but that this functionality is not available in the limited-functionality version of the application.

It can be determined that the user needs a particular functionality in a variety of different ways. In some cases, this can be determined when the user searches for the functionality in the limited-functionality application. For example, the user may type "two columns for text" into a search control in the help menu of the limited-functionality application. Based on this keyword search, it can be inferred that the user wishes to transform the single column of text into two columns. As another example, it can be determined that the user needs the functionality based on a gesture or control input that is not supported by the limited-functionality application. For example, the user may perform a particular gesture to try to split the single column into two columns. In this case, such a gesture is not supported by the limited-functionality application, but is provided by the full-functionality application. Thus, it can be inferred that the user wished to transform the single column of text into two columns based on this gesture.

In response to determining that a functionality that is desired by the user is not available in the limited-functionality application, a recommendation is provided to transition the creation to the full-functionality application that supports the functionality. In one or more embodiments, a preview of the creation, after the functionality supported by the full-functionality application is applied to the creation, may be provided to the user along with the recommendation. Continuing with the example above, a two-column version of the text may be automatically generated as a preview that is shown to the user. For example, the full-functionality application may be accessed to apply the functionality to the creation such that an image of a two-column version of the text is generated. Providing the preview further encourages the user to transition the creation to the full-functionality application by enabling the user to see what the creation will look like after the functionality is applied.

In response to receiving a selection of a selectable control associated with the recommendation, the creation is provided (e.g., communicated over a network) to the full-functionality application, which may be located at a different computing device. The user can then continue working with the creation using the full-functionality application.

Recommending that the user transition the creation to the full-functionality application at just the right time, increases the likelihood that users of the limited-functionality application (who have not yet purchased the full-functionality version) will upgrade to the full-functionality version of the application, thereby increasing revenue for application developers. In addition, recommending the transition at just the right time, is convenient for users that already own the full-functionality application, but may not realize that the functionality is available at the full-functionality version of the application.

Example Environment

FIG. 1 is an illustration of a digital medium environment 100 in an example implementation that is operable to employ techniques described herein. The digital medium environment 100 includes a first computing device 102 at which a limited-functionality application 104 is implemented, and a second computing device 106 at which a full-functionality application 108 is implemented. Generally, both the limited-functionality application 104 and the full-functionality application 108 are configured to generate or edit a creation 110. As described herein, creation 110 may correspond to any type of photo, video, document, web page, blog post, and so forth. As described herein, the limited-functionality application 104 is a different version of the full-functionality application 108 and includes a subset of the functionalities provided by the full-functionality application 108. Thus, the limited-functionality application 104 includes less functionalities than the full-functionality application 108.

The digital medium environment 100 is further illustrated as including an application functionality service 112 that is representative of functionality to dynamically recommend a transition from use of the limited-functionality application 104 to the full-functionality application 108. For example, while the user is using the limited-functionality application 104 to create or edit a creation 110, the application functionality service 112 is configured to determine whether the user needs a functionality that is not available or supported by the limited-functionality application. As described herein, a functionality corresponds to any type of function, effect, or operation provided by an application, such as text editing functionality, video editing functionality, photo editing functionality, and so forth. If the functionality is not available at the limited-functionality application 104, then the application functionality service 112 determines whether the functionality is supported by the full-functionality application 108. A recommendation to transition the creation 110 to the full-functionality application 108 is provided if it is determined that the full-functionality application 108 supports the functionality.

In one or more embodiments, if the functionality is supported by the full-functionality application 108, the application functionality service 112 may generate a preview 114 by applying the functionality supported by the full-functionality application 108 to the creation 110. In some cases, the preview 114 may be generated by a preview module implemented at a remote server (e.g., in the cloud). Alternately, if the full-functionality application is available at the device 106, then the preview 114 may be generated by a preview module implemented at device 106. The application functionality service 112 may then provide the preview 114 to the limited-functionality application 104 for display. In this way, the user is able to see what the creation 110 will look like if the functionality supported by the full-functionality application 108 is applied to the creation 110.

In response to receiving a selection of a selectable control associated with the recommendation, the creation 110 is provided (e.g., communicated over network 116) to the full-functionality application 108, which may be located at a different computing device (e.g., device 106). The user can then continue working with the creation using the full-functionality application 108. Notably, if the user already owns the full-functionality application 108, then the creation 110 can be communicated to the full-functionality application 108 that is implemented at a computing device that is registered to run the application. In some cases, the user may not yet own a copy of the full-functionality application 108. In this instance, the user may first be asked whether the user would like to purchase the full-functionality application 108 so that the functionality can be applied to the creation 110.

In one or more embodiments, first computing device 102, second computing device 106, and application functionality service 112 are communicatively coupled, one to another, via a network 116. Alternately, in one or more embodiments, first computing device 102 and second computing device 106 may be implemented as a single computing device. Further, while application functionality service 112 is illustrated as being implemented remote from devices 102 and 106, in some embodiments the application functionality service 112 may be implemented, or partially implemented, at device 102 or device 106. Computing devices that implement the first computing device 102, second computing device 106, and application functionality service 112, may be configured in a variety of different ways.

A computing device, for instance, may be configured as a desktop computer, a laptop computer, a mobile device (e.g., assuming a handheld configuration such as a tablet or mobile phone), and so forth. Thus, a computing device may range from full resource devices with substantial memory and processor resources (e.g., personal computers, game consoles) to a low-resource device with limited memory and/or processing resources (e.g., mobile devices). Additionally, although a single computing device is described in some instances, the computing device may be representative of a plurality of different devices, such as multiple servers utilized by a business to perform operations "over the cloud" for the application functionality service 112, further discussion of which may be found in relation to FIG. 6.

Although network 116 is illustrated as the Internet, the network may assume a wide variety of configurations. For example, network 116 may include a wide area network (WAN), a local area network (LAN), a wireless network, a public telephone network, an intranet, and so on. Further, although a single network 116 is shown, network 116 may also be configured to include multiple networks.

Figure 2:
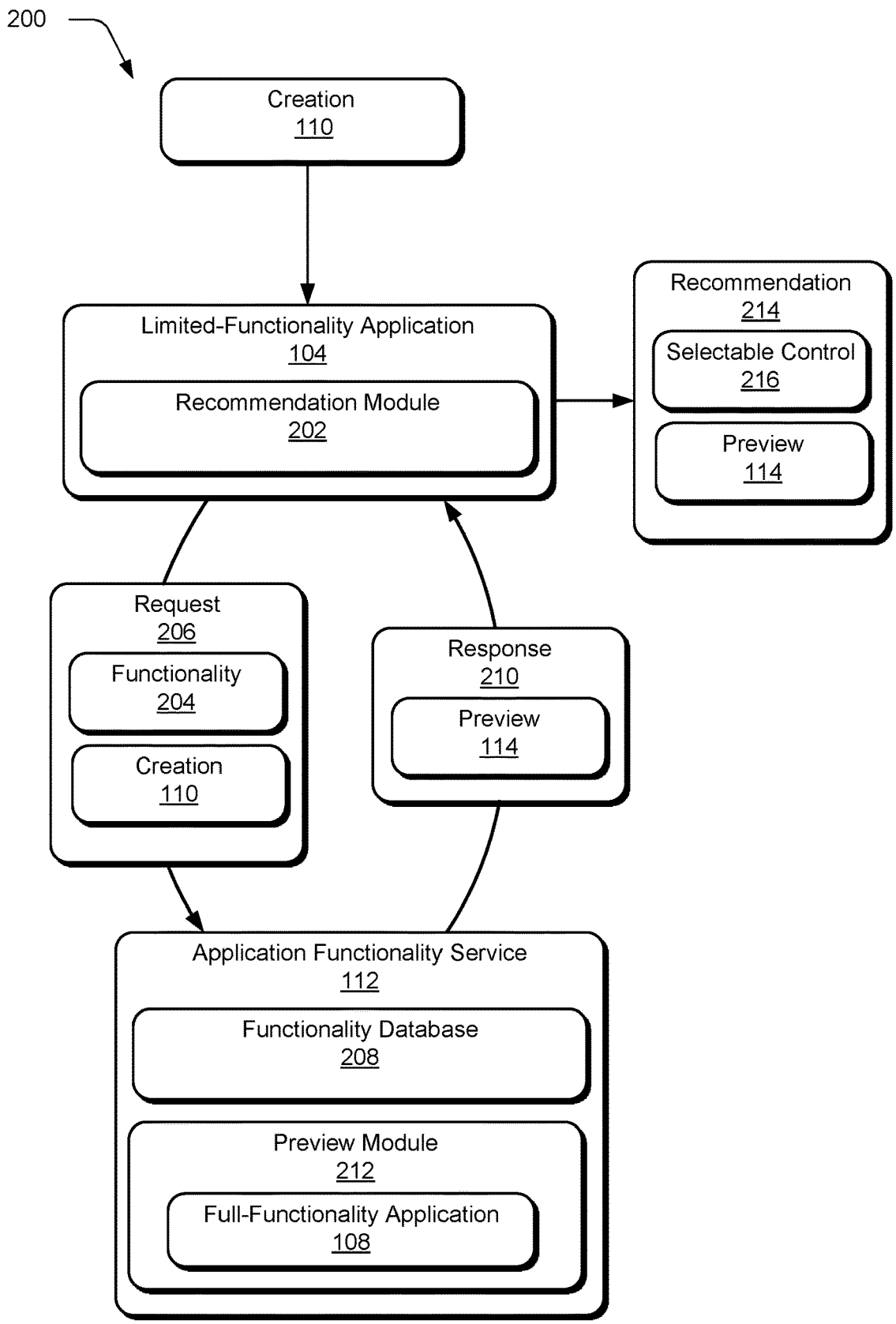
FIG. 2 illustrates a system in an example implementation in which operation of the application functionality service of FIG. 1 is shown in greater detail.

FIG. 2 illustrates a system 200 in an example implementation in which operation of the application functionality service 112 of FIG. 1 is shown in greater detail.

In system 200, limited-functionality application 104 is illustrated as including a recommendation module 202 that is configured to monitor user interactions with a limited-functionality application 104 to determine whether the user needs, or is attempting to use, a functionality 204 for a creation 110 that is not available to, or supported by, the limited-functionality application 104.

The recommendation module 202 can determine that the user needs a functionality 204 that is not available at the limited-functionality application 104 in a variety of different ways. In one or more embodiments, the recommendation module 202 can determine that the user would like to use functionality 204 by detecting user input to perform a keyword search for a functionality 204 (e.g., multi-column, height balance, justify text) that is not supported by the limited-functionality application 104. Alternately or additionally, the recommendation module 202 can determine that the user would like to use functionality 204 by detecting user input to perform a functionality that is not recognized or supported by the limited-functionality application 104. For example, recommendation module 202 may determine that the user has performed a gesture (e.g., swipe or double tap) or other type of user input that is not recognized by the limited-functionality application 104.

Figure 3A:
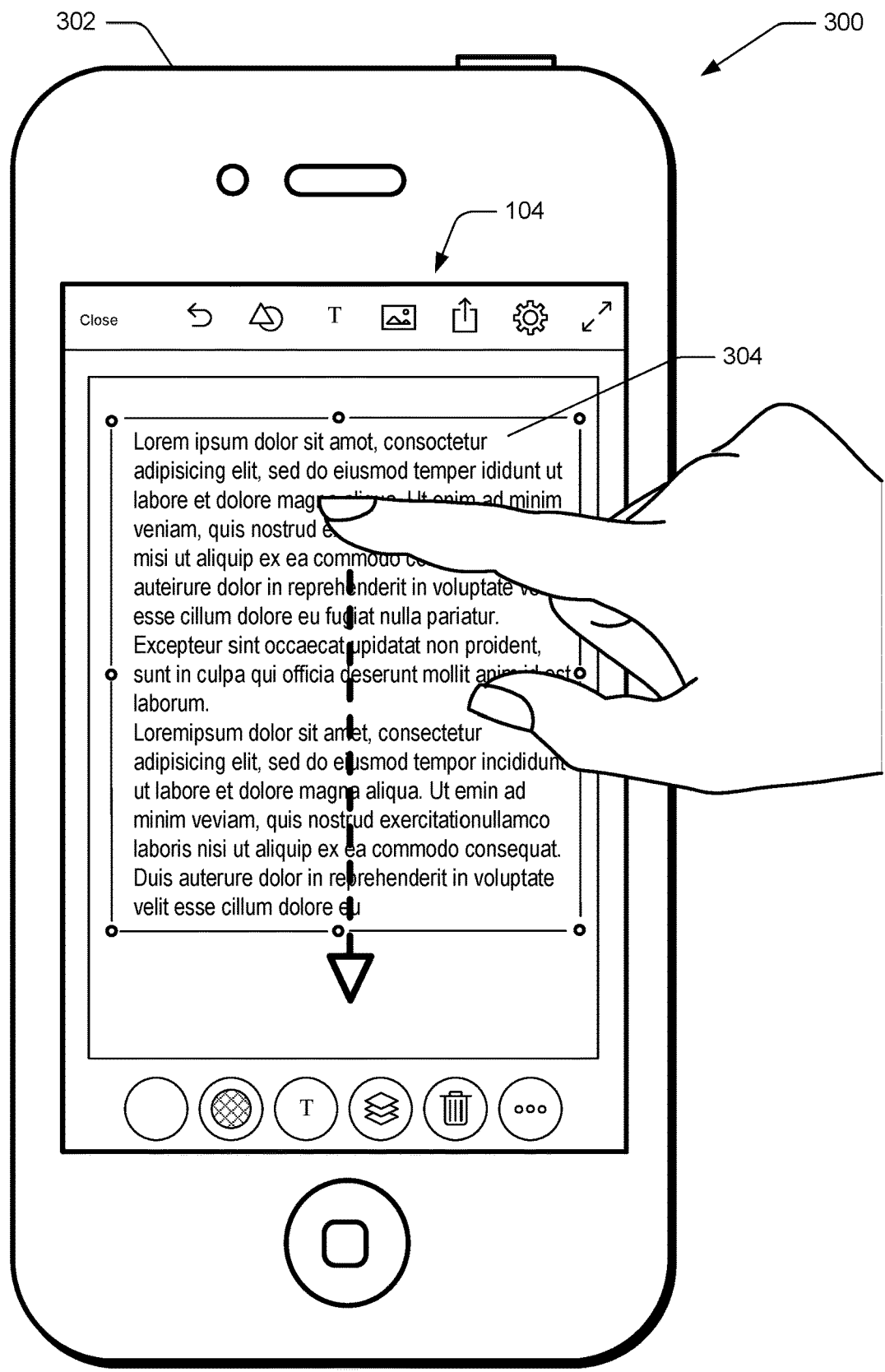
FIG. 3A illustrates an example of using a limited-functionality application in accordance with one or more embodiments.

As an example, consider FIG. 3A which illustrates an example 300 of using a limited-functionality application 104 in accordance with one or more embodiments. In this example, a limited-functionality application 104 is implemented at a smartphone 302 to generate and edit a creation 304. In this case, the limited-functionality application 104 corresponds to "Adobe Comp", which is a text-editing application that allows a user to generate and edit a textual document.

In this example, recommendation module 202 detects that the user would like to use a functionality to convert a single text frame into a two-column text frame when the user selects the text frame and makes a "vertical line gesture" from the top middle to the bottom middle of the frame. Notably, in the corresponding full-functionality version of the application (e.g., Adobe InDesign), this gesture causes the single text frame to be split into two text frames. However, this gesture is not recognized or supported by the limited-functionality application 104. As another example, recommendation module 202 may detect that the user would like to use this functionality when the user opens a help menu of the application, and searches for "two-column text frame" or "multi-column text frame".

In one or more implementations, recommendation module 202 may detect that the user would like to use a functionality 204 by determining that the interactions correspond to a pattern of previous user interactions with the limited-functionality application 104 prior to transitioning to use of the full-functionality application 108. For example, previous users may have performed particular gestures, keyword searches, control inputs, and so forth prior to transitioning a creation to the full-functionality application 108. Therefore, based on the previous pattern of user interactions, the recommendation module 202 can determine that the user would like to use a particular functionality. In some cases, a list of predefined patterns may be utilized to determine whether a user action matches the predefined pattern. If a match is found, then the recommendation module 202 determines that the user would like to use a functionality mapped to the predefined pattern. Notably, patterns may differ for different states of the application (e.g., editing or viewing a creation) as well as for different types of creations.

In response to detecting that the user would like to use the particular functionality 204, the recommendation module 202 determines that the functionality 204 is not available at, or supported by, the limited-functionality application 104. In one or more embodiments, the functionality 204 may be marked as "available at full-functionality application", in which case the recommendation module 202 knows that the functionality 204 is available at the corresponding full-functionality application.

Alternately, the recommendation module 202 may simply determine that the functionality 204 is not available at the limited-functionality application 104, and in response to this determination, send a request 206 to the application functionality service 112 to determine whether the functionality 204 is supported by the full-functionality application 108. The request 206 may include the terms in the keyword search for the functionality 204 and/or the user input (e.g., gestures). In addition, request 206 may include the creation 110.

In one or more embodiments, application functionality service 112 is implemented remote from limited-functionality application 104. For example, limited-functionality application 104 may be implemented at device 102, and application functionality service 112 may be implemented as a cloud-based service. In this case, the request 206 may be communicated over network 116 to application functionality service 112. Alternately, application functionality service 112 may be implemented local to limited-functionality service. For example, both limited-functionality application 104 and application functionality service 112 may be implemented at device 102.

In response to receiving request 206, application functionality service 112 determines whether the functionality 204 is supported by a full-functionally application 108, which corresponds to full-functionality version of the limited-functionality application. To do so, application functionality service 112 can search a functionality database 208, which includes a mapping of all of the functionalities supported by the full-functionality application 108. The functionality database 208 may also include, for each functionality, the corresponding gestures or user inputs that can be used to invoke the functionality. Thus, if the request 206 includes a particular gesture or user input, the application functionality service 112 searches the functionality database 208 to locate a functionality associated with the corresponding gesture or user input. Similarly, if the request 206 includes a keyword search, then the application functionality service 112 searches the functionality database 208, using the keyword search, to locate the functionality.

In response to determining that the functionality 204 is available at, or supported by, the full-functionality application 108, the application functionality service 112 may communicate a response 210 back to the recommendation module 202 that indicates that the functionality 204 is supported by the full-functionality application 108.

In one or more embodiments, the application functionality service 112 utilizes a preview module 212 to generate a preview 114 of the creation 110 if the functionality 204 is applied to the creation 110. For example, the preview module 212 can access the full-functionality application 108 to apply the functionality 204 to the creation 110. In some cases, the preview may correspond to an image (e.g., a JPEG) of what the creation 110 will look like after the functionality 204 is applied. Then, application functionality service 112 may include the preview 114 with the response 210 communicated to the recommendation module 202.

Figure 3B:
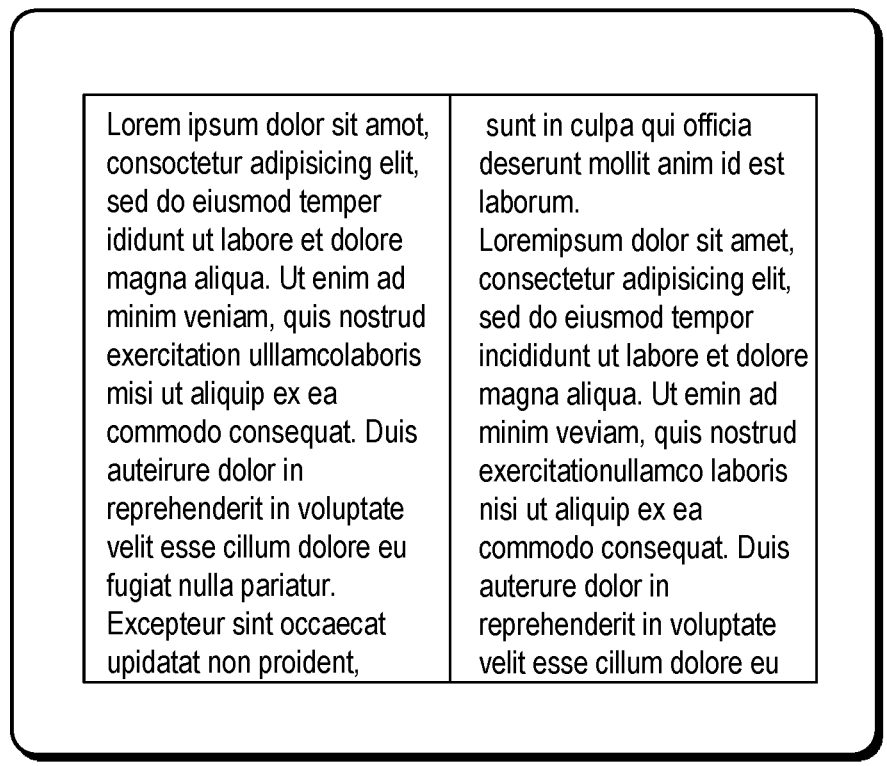
FIG. 3B illustrates an example of a preview of generated by applying a functionality to a creation in accordance with one or more embodiments.

As an example of a preview, consider FIG. 3B which illustrates an example of a preview generated by applying a functionality to a creation in accordance with one or more embodiments. In this example, preview 114 is an image that depicts what the single column of text will look like after the two-column functionality is applied to the text.

In response to receiving the response 210 indicating that the functionality 204 is supported by the full-functionality application 108, recommendation module 202 provides a recommendation 214 to transition the creation 110 to the full-functionality application 108 that supports the functionality 204. To provide the recommendation 214, recommendation module 202 causes display of a selectable control 216 in the user interface of the limited-functionality application 104 that indicates that the functionality 204 is supported by the full-functionality application 108. The selectable control 216 can be selected by the user to automatically cause the creation 110 to be transitioned to the full-functionality application 108. In one or more embodiments, recommendation module 202 may also cause a message to be displayed in the user interface of the limited-functionality application 104 that indicates that the corresponding functionality 204 is only available in the full-functionality application 108, and that the user can send the creation 110 to the full-functionality application by selecting the selectable control 216.

Figure 3C:
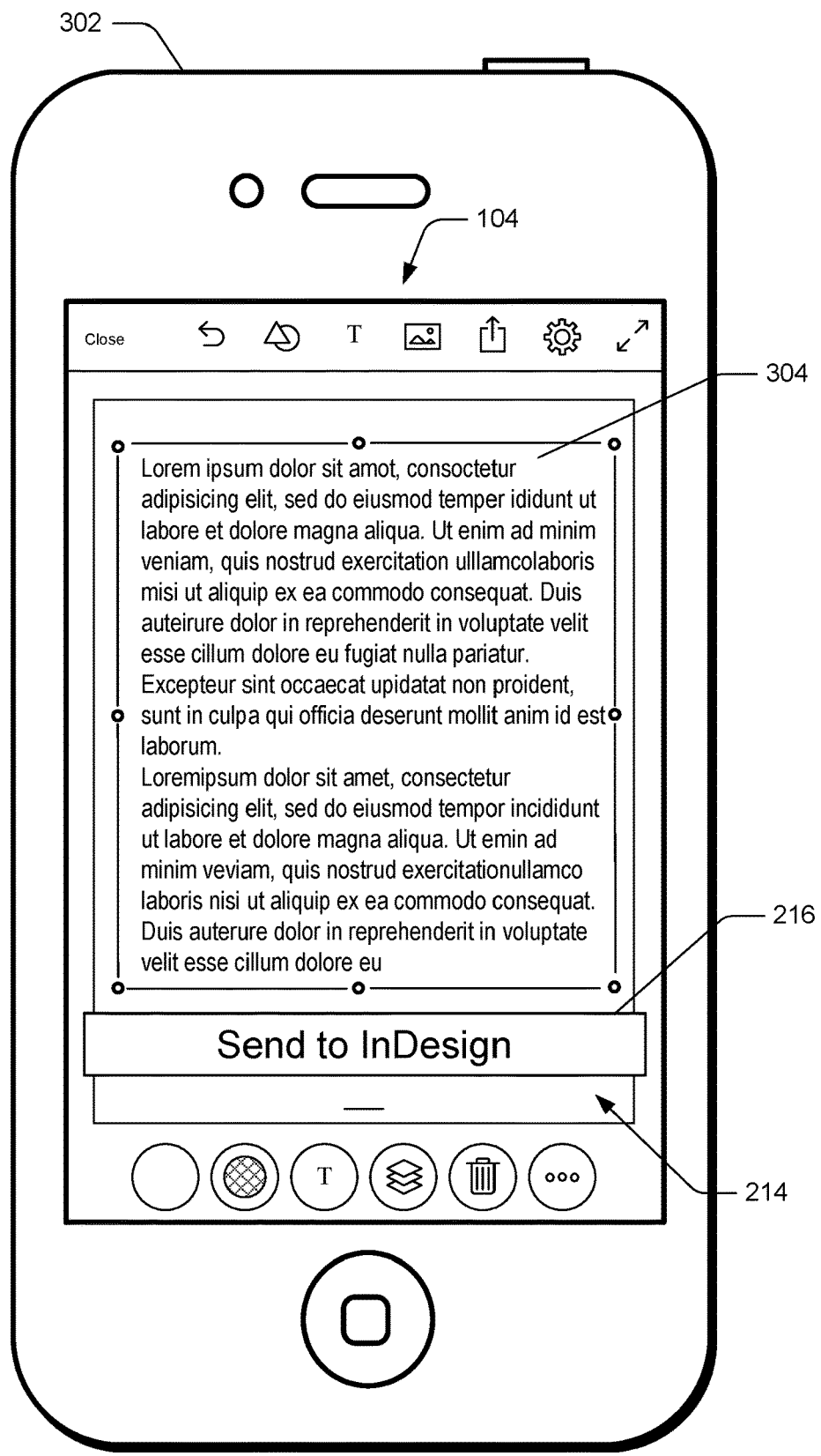
FIG. 3C illustrates an example of displaying a selectable control in the user interface of a limited-functionality application to transition a creation to a full-functionality application 108 in accordance with one or more embodiments.

As an example, consider FIG. 3C, which illustrates an example of displaying a selectable control in the user interface of a limited-functionality application to transition a creation to a full-functionality application in accordance with one or more embodiments. In this example, a selectable control 216 is displayed in the limited-functionality application that includes the words "Send to InDesign". This selectable control 216 alerts the user that they can send creation 110 to InDesign, which is a full-functionality version of the limited-functionality application, in order to divide the single column of text into a two-column text frame. If the user selects the selectable control 216, then recommendation module 202 causes the creation 110 to be dynamically transitioned to the full-functionality application 108.

In one or more embodiments, recommendation module 202 is configured to display the preview 114 along with the selectable control 216. Doing so enables the user to see what their creation will look like after applying the desired functionality 204.

Figure 3D:
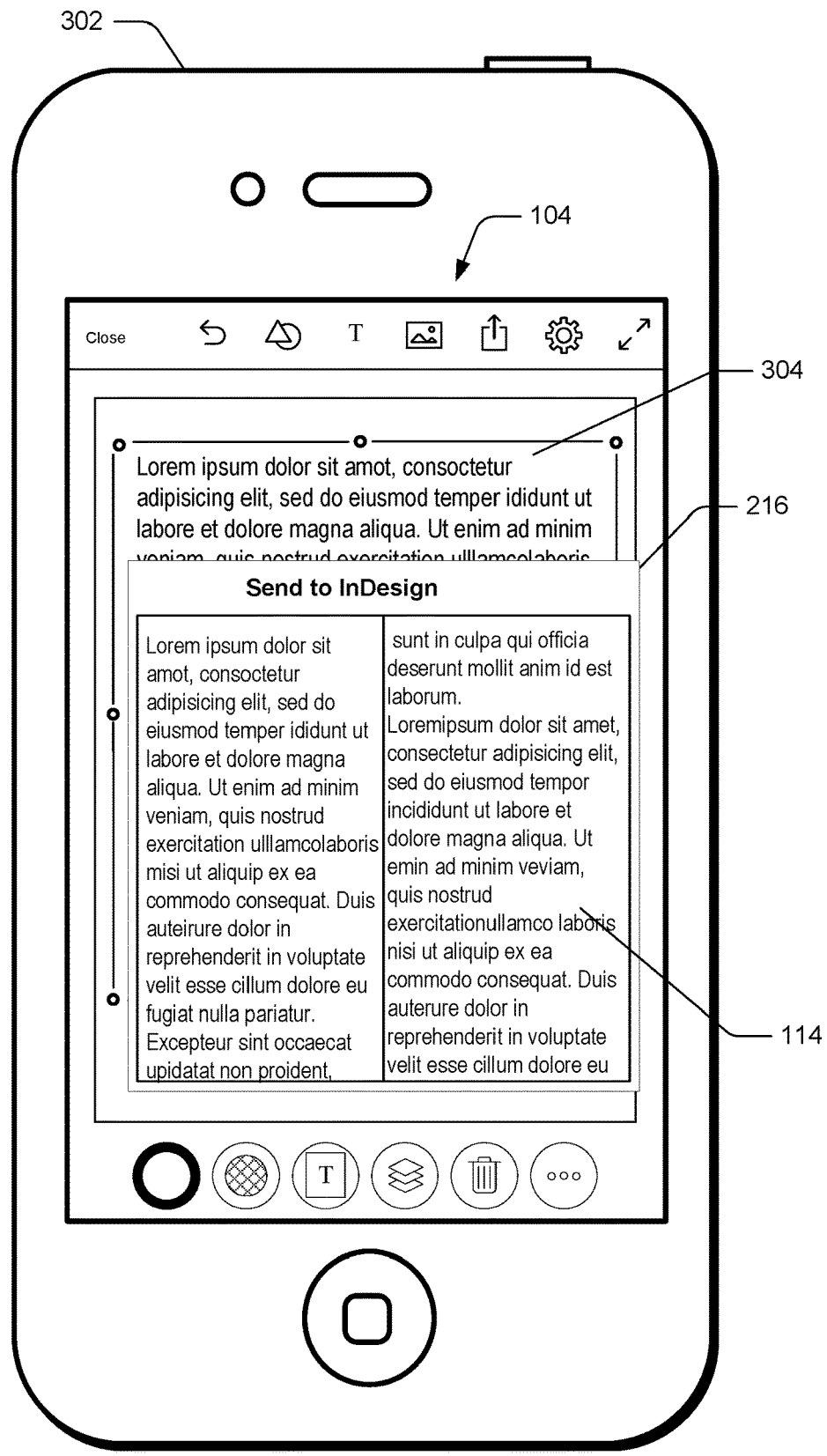
FIG. 3D illustrates an example of displaying a selectable control and a preview in a user interface of a limited-functionality application to transition a creation to a full-functionality application in accordance with one or more embodiments.

As an example, consider FIG. 3D, which illustrates an example of displaying a selectable control and a preview in a user interface of a limited-functionality application to transition a creation to a full-functionality application in accordance with one or more embodiments. In this example, the selectable control 216 is displayed in the limited-functionality application along with the preview 114, that shows what the text will look like after applying the two-column functionality. Providing the preview 114 entices the user to transition the creation 110 to the full-functionality application 108. In some cases, the preview 114 may be displayed responsive to user input (e.g., hovering over or long pressing) to the selectable control 216.

If the user selects the selectable control 216, the recommendation module 202 causes the creation 110 to be transitioned to the full-functionality application 108. For example, the full-functionality application may automatically open the creation 110 to enable the user to apply the functionality to the creation 110.

In some cases, the user may not yet own a copy of the full-functionality application 108. In this instance, recommendation module 202 may ask the user if the user would like to purchase the full-functionality application 108 so that the functionality can be applied to the creation 110.

In one or more embodiments, a gesture may be mapped to different functionalities depending on a state of the limited-functionality application 104. For example, a particular gesture may be mapped to a first functionality if the application is in a first state, and a second functionality if the application is in a second state. In this case, the determined functionality 204 is based at least in part on the determined state of the application when the gesture input is received.

Consider, for example, that when a limited-functionality photo editing application is opened in an "editing state", a "top to down" gesture may be used to split the image. However, if the same image is opened in a "view state", the same top to down gesture may be used to create a side by side view of the image, as opposed to splitting the image. Thus, whether or not a functionality is available at the limited-functionality application 104 may depend on the state of the application when the gesture input is received. Continuing with the example above, the limited-functionality application 204 may support the top to down gesture in the editing state to split the image, but not support the top to down gesture in the view state to create the side by side view. In this case, if the top to down gesture is received when the application is in the editing state, the limited functionality application may simply provide the split image functionality. However, if the same top to down gesture is received in the view state, then the recommendation module 202 may recommend a transition to the full-functionality application 108 which supports the gesture in the view state.

In one or more embodiments, if there is no functionality for a particular gesture in a first state, but the gesture is mapped to a functionality, available at the full-functionality application 108, in a different state, then the recommendation module 202 may determine that the user intends to use the functionality corresponding to the different state. In this case, a recommendation may be provided to transition the creation to the full-functionality application to utilize the functionality of the different state.

Example Procedures

The following discussion describes techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks.

Figure 4:
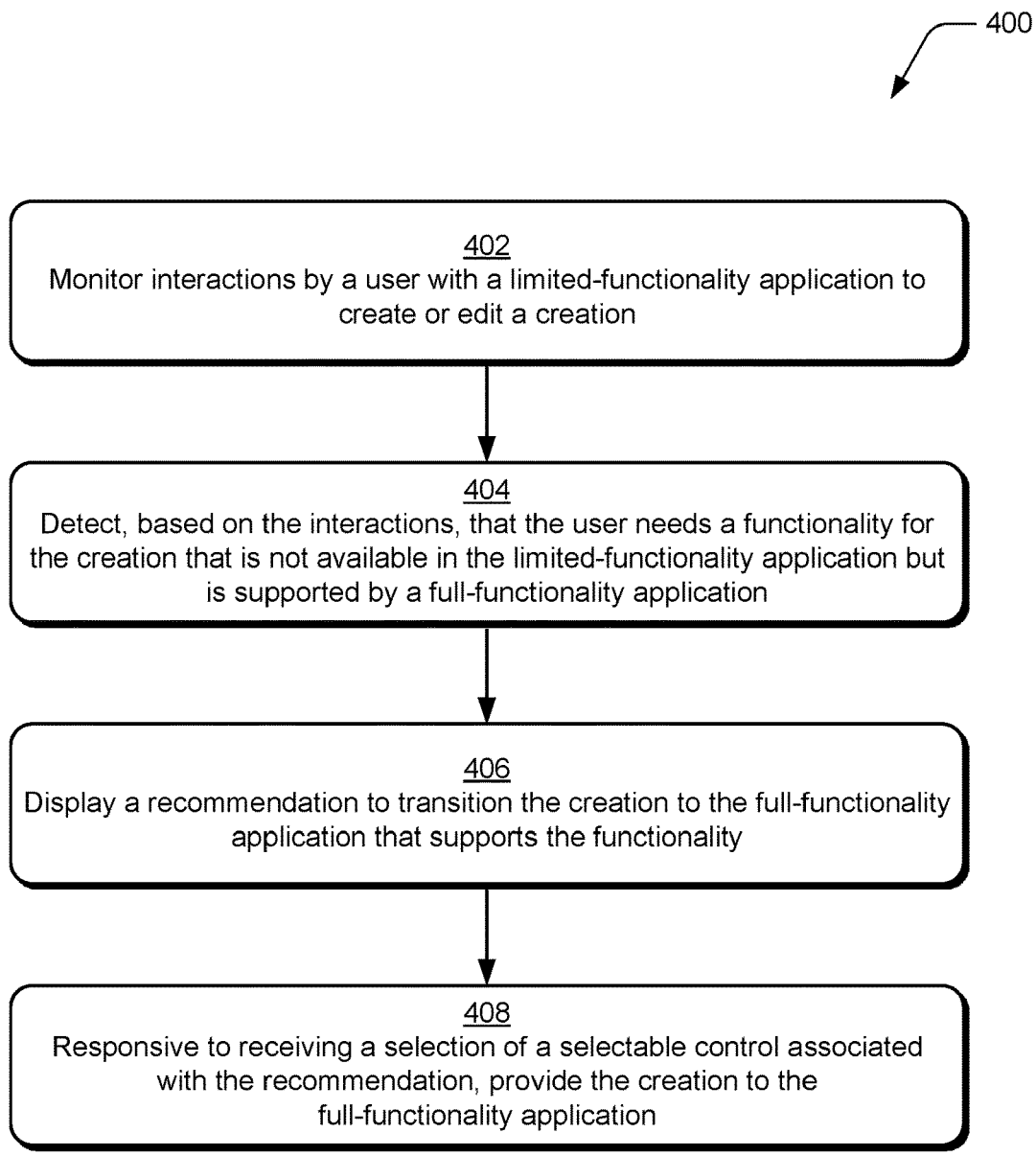
FIG. 4 depicts a procedure in an example implementation in which a transition from use of a limited-functionality application to a full-functionality application is recommended.

FIG. 4 depicts a procedure 400 in an example implementation in which a transition from use of a limited-functionality application to a full-functionality application is recommended.

At 402, interactions by a user with a limited-functionality application to generate or edit a creation are monitored. For example, recommendation module 202 monitors interactions by a user with a limited-functionality application 104 to generate or edit a creation 110.

At 404, it is detected, based on the interactions, that the user needs a functionality for the creation that is not available in the limited-functionality application but is supported by a full-functionality application. For example, recommendation module 202 determines, based on the interactions, that the user needs a functionality 204 for the creation 110 that is not available in the limited-functionality application 104 but is supported by the full-functionality application 108.

At 406, a recommendation to transition the creation to the full-functionality application that supports the functionality is displayed. For example, recommendation module 202 causes display of recommendation 216 to transition the creation 110 to the full-functionality application 108 that supports the functionality 204. As described throughout, the limited-functionality application 104 includes a subset of the functionalities of the full-functionality application 108.

At 408, in response to receiving a selection of a selectable control associated with the recommendation, the creation is provided to the full-functionality application. For example, application functionality service 112 provides the creation 110 to the full-functionality application 108

Figure 5:
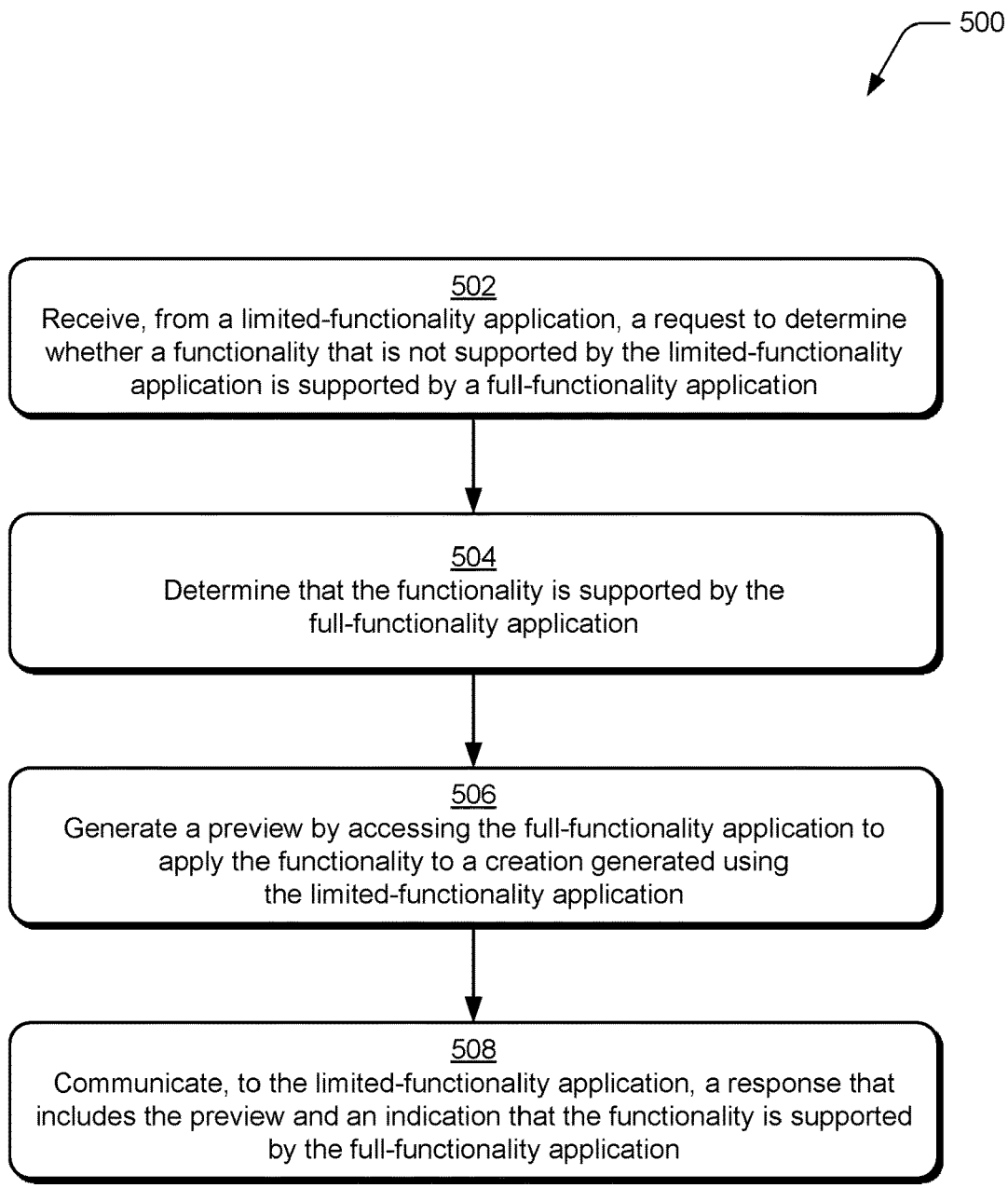
FIG. 5 depicts a procedure in an example implementation in which it is determined whether a functionality that is not supported by a limited-functionality application is supported by a full-functionality application.

FIG. 5 depicts a procedure 500 in an example implementation in which it is determined whether a functionality that is not supported by a limited-functionality application is supported by a full-functionality application.

At 502, a request is received, from a limited-functionality application, to determine whether a functionality that is not supported by the limited-functionality application is supported by a full-functionality application. For example, application functionality service 112 receives request 206, from limited-functionality application 104, to determine whether functionality 204 that is not supported by the limited-functionality application 104 is supported by the full-functionality application 108. The request 206 may include a creation generated using the limited-functionality application to which the functionality is to be applied.

At 504, it is determined that the functionality is supported by the full-functionality application. For example, the application functionality service 112 determines that the functionality 204 is supported by the full-functionality application 108.

At 506, if the functionality is supported by the full-functionality application, a preview is generated by applying the functionality to the creation. For example, a preview module 212 uses the full-functionality application 108 to apply the functionality 204 to the creation 110 to generate preview 114.

At 508, a response that includes the preview and an indication that the functionality is supported by the full-functionality application is communicated to the limited-functionality application. For example, application functionality service 112 communicates a response 206 that includes preview 114 and an indication that the functionality 204 is supported by full-functionality application 108.

Example System and Device

Figure 6:
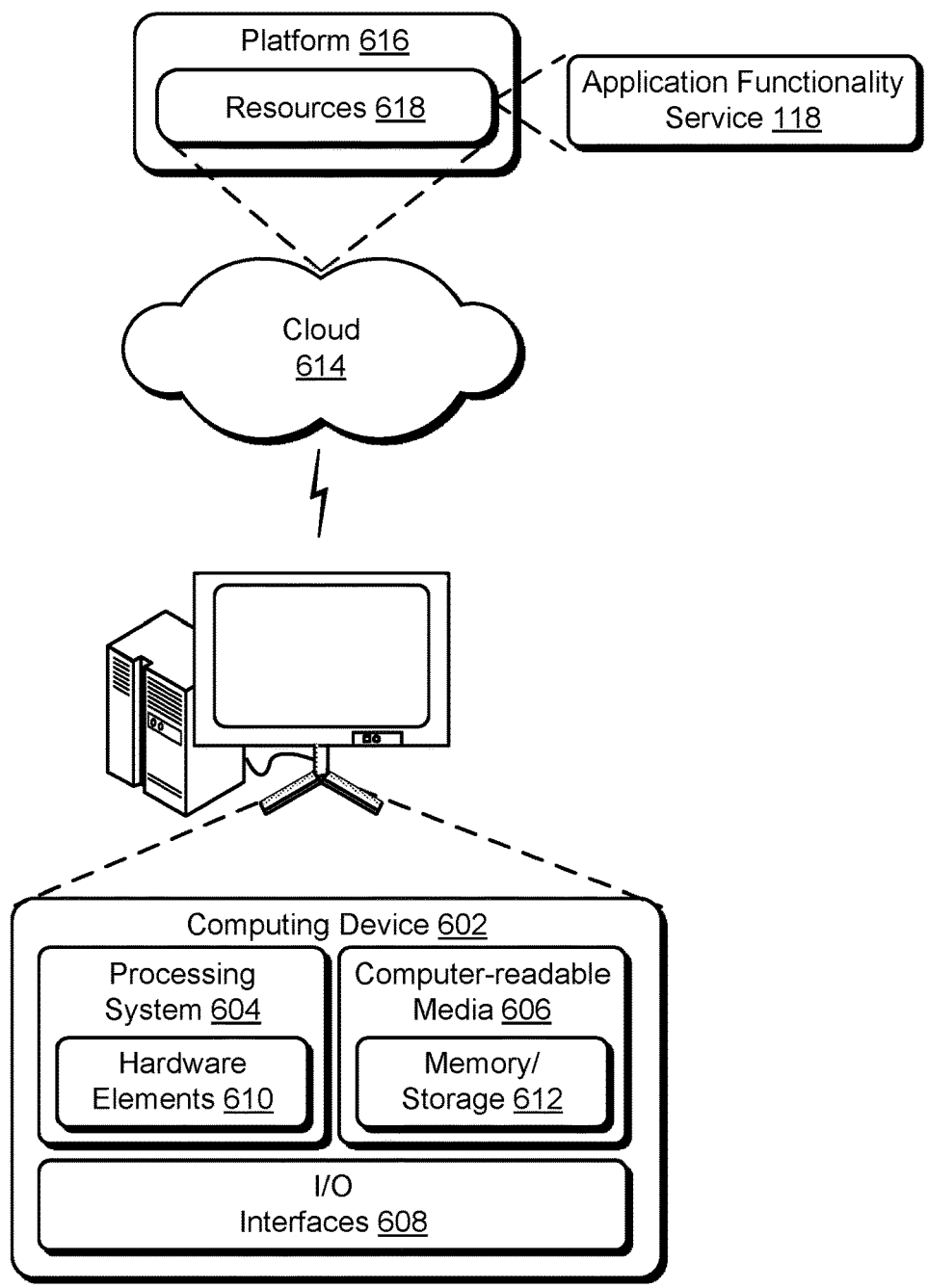
FIG. 6 illustrates an example system that includes an example computing device that is representative of one or more computing systems and/or devices that may implement the various techniques described herein.

FIG. 6 illustrates an example system generally at 600 that includes an example computing device 602 that is representative of one or more computing systems and/or devices that may implement the various techniques described herein. This is illustrated through inclusion of the application functionality service 112. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O interface 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware element 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 606 is illustrated as including memory/storage 612. The memory/storage 612 represents memory/storage capacity associated with one or more computer-readable media. The memory/storage component 612 may include volatile media (such as random access memory (RAM)) and/or nonvolatile media (such as read only memory (ROM), Flash memory, optical disks, magnetic disks, and so forth). The memory/storage component 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of a module that is executable by the computing device 602 as software may be achieved at least partially in hardware, e.g., through use of computer-readable storage media and/or hardware elements 610 of the processing system 604. The instructions and/or functions may be executable/operable by one or more articles of manufacture (for example, one or more computing devices 602 and/or processing systems 604) to implement techniques, modules, and examples described herein.

The techniques described herein may be supported by various configurations of the computing device 602 and are not limited to the specific examples of the techniques described herein. This functionality may also be implemented all or in part through use of a distributed system, such as over a "cloud" 614 via a platform 616 as described below.

The cloud 614 includes and/or is representative of a platform 616 for resources 618. The platform 616 abstracts underlying functionality of hardware (e.g., servers) and software resources of the cloud 614. The resources 618 may include applications and/or data that can be utilized while computer processing is executed on servers that are remote from the computing device 602. Resources 618 can also include services provided over the Internet and/or through a subscriber network, such as a cellular or Wi-Fi network.

The platform 616 may abstract resources and functions to connect the computing device 602 with other computing devices. The platform 616 may also serve to abstract scaling of resources to provide a corresponding level of scale to encountered demand for the resources 618 that are implemented via the platform 616. Accordingly, in an interconnected device embodiment, implementation of functionality described herein may be distributed throughout the system 600. For example, the functionality may be implemented in part on the computing device 602 as well as via the platform 616 that abstracts the functionality of the cloud 614.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to recommend a transition from use of a limited-functionality version of an application to a full-functionality version of the application, a method implemented by at least one computing device comprising:
   monitoring, by the at least one computing device, interactions by a user with the limited-functionality version of the application to generate or edit a creation, the interactions including a keyword search for a requested functionality or a gesture for the requested functionality, the requested functionality supported by the full-functionality version of the application but not supported by the limited-functionality version of the application;
   detecting, based on the interactions with the limited-functionality version of the application, user intent to perform the requested functionality on the creation;
   responsive to the detecting user intent to perform the requested functionality on the creation, communicating, over a network to an application functionality service, a request to apply the requested functionality supported by the full-functionality version of the application to the creation generated using the limited-functionality version of the application, the request including the creation and identifying the requested functionality;
   receiving, over the network from the application functionality service, a preview object generated at the application functionality service by applying the requested functionality of the full-functionality version of the application to the creation;
   causing display of a user interface element comprising the preview object and a recommendation to transition the creation to the full-functionality version of the application on a display of the at least one computing device; and
   responsive to receiving a selection of a selectable control associated with the recommendation, providing the creation to the full-functionality version of the application by communicating the creation, over the network, from the at least one computing device to the full-functionality version of the application implemented at an additional computing device.

2. The method as described in claim 1, wherein the detecting user intent to perform the requested functionality on the creation comprises determining that the requested functionality of the keyword search is not available at the limited-functionality version of the application.

3. The method as described in claim 1, wherein the detecting user intent to perform the requested functionality on the creation comprises determining that the gesture does not correspond to functionalities that are supported by the limited-functionality version of the application.

4. The method as described in claim 1, wherein the detecting comprises determining that the interactions correspond to a pattern of previous user interactions with the limited-functionality version of the application prior to transitioning to use of the full-functionality version of the application.

5. The method as described in claim 1, wherein the limited-functionality version of the application comprises a mobile application configured to be executed on a mobile device, and wherein the full-functionality version of the application comprise a desktop application configured to be executed on a personal computing device or a laptop computing device.

6. The method as described in claim 1, wherein the limited-functionality version of the application comprises a mobile application configured to be executed on a mobile device.

7. The method as described in claim 1, wherein the full-functionality version of the application comprises a desktop application configured to be executed on a personal computing device or a laptop computing device.

8. In a digital medium environment a method implemented by at least one computing device comprising:
   receiving, from a limited-functionality version of the application, a request to apply a functionality supported by the full-functionality version of the application to a creation generated using the limited-functionality version of the application, the request including the creation and generated in response to detecting, by the limited-functionality version of the application, user intent to perform the functionality on the creation, the functionality not supported by the limited-functionality version of the application;
   determining, by the at least one computing device, that the functionality is supported by a full-functionality version of the application;
   generating, by accessing the full-functionality version of the application, a preview object by applying the requested functionality to the creation using the full functionality version of the application; and
   communicating, to the limited-functionality version of the application, a response that includes the preview object and an indication that the requested functionality is supported by the full-functionality version of the application.

9. The method as described in claim 8, wherein the request includes one or more gestures or user inputs invoked at the limited-functionality version of the application, and wherein the determining that the functionality is supported by the full-functionality version of the application comprises searching a functionality database to locate a functionality that is associated with the one or more gestures or user inputs.

10. The method as described in claim 9, wherein the one or more gestures or user inputs are mapped to different functionalities depending on a state of the limited-functionality version of the application, and wherein the method further comprises determining the functionality based at least in part on the state of the limited-functionality version of the application when the one or more gestures or user inputs are received.

11. The method as described in claim 8, wherein the request includes a keyword search performed at the limited-functionality version of the application, and wherein the determining that the functionality is supported by the full-functionality version of the application comprises searching a functionality database to locate a functionality that is associated with the keyword search.

12. The method as described in claim 8, wherein the limited-functionality version of the application comprises a mobile application configured to be executed on a mobile device, and wherein the full-functionality version of the application comprises a desktop application configured to be executed on a personal computing device or a laptop computing device.

13. A computing device comprising:
   a display; and
   at least a memory and a processor to perform operations comprising:
      monitoring interactions by a user with a limited-functionality version of an application to generate or edit a creation, the interactions including a keyword search for a requested functionality or a gesture for the requested functionality, the requested functionality supported by a full-functionality version of the application but not supported by the limited-functionality version of the application;
      detecting, based on the interactions with the limited-functionality version of the application, user intent to perform the requested functionality on the creation;
      responsive to the detecting user intent to perform the requested functionality on the creation, communicating, over a network to an application functionality service, a request to apply the requested functionality supported by the full-functionality version of the application to the creation generated using the limited-functionality version of the application, the request including the creation and identifying the requested functionality;
      receiving, over the network from the application functionality service, a preview object generated at the application functionality service by applying the requested functionality of the full-functionality version of the application to the creation;
      causing display of a user interface element comprising the preview object and a recommendation to transition the creation to the full-functionality version of the application on the display of the computing device; and
      responsive to receiving a selection of a selectable control associated with the recommendation, providing the creation to the full-functionality version of the application by communicating the creation, over the network, from the computing device to the full-functionality version of the application implemented at an additional computing device.

14. The computing device as described in claim 13, wherein the interactions comprise the keyword search for the requested functionality.

15. The computing device as described in claim 13, wherein the interactions comprise the gesture for the requested functionality.

16. The computing device as described in claim 13, wherein the detecting comprises detecting the user intent to perform the requested functionality based on determining that the interactions correspond to a pattern of previous user interactions with the limited-functionality version of the application prior to transitioning to use of the full-functionality version of the application.

17. The computing device as described in claim 13, wherein the limited-functionality version of the application comprises a mobile application configured to be executed on a mobile device, and wherein the full-functionality version of the application comprises a desktop application configured to be executed on a different computing device.

18. The computing device as described in claim 13, wherein the detecting user intent to perform the requested functionality on the creation comprises determining that the requested functionality of the keyword search is not available at the limited-functionality version of the application.

19. The computing device as described in claim 13, wherein the detecting user intent to perform the requested functionality on the creation comprises determining that the gesture does not correspond to functionalities that are supported by the limited-functionality version of the application.

* * * * *